Patented Mar. 12, 1946

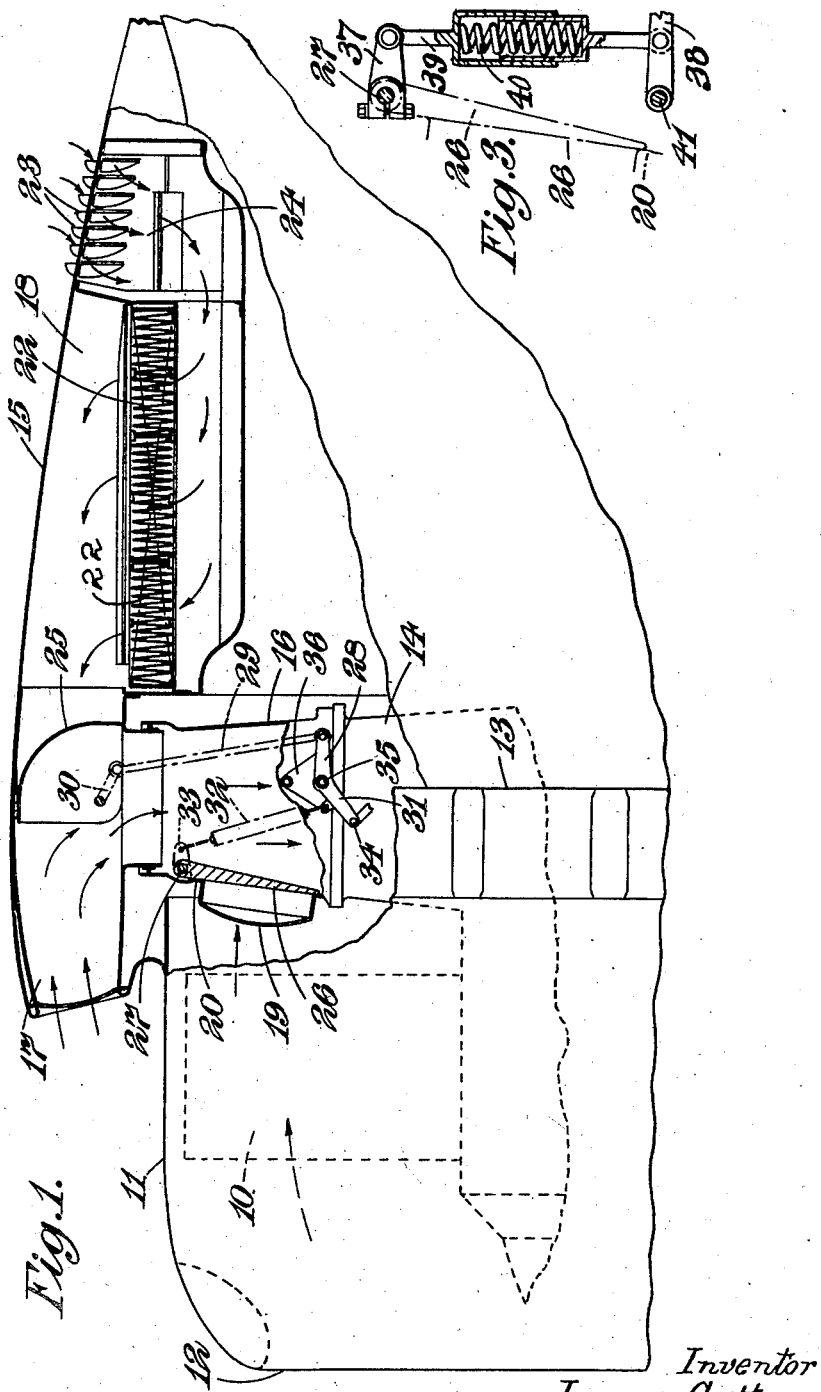

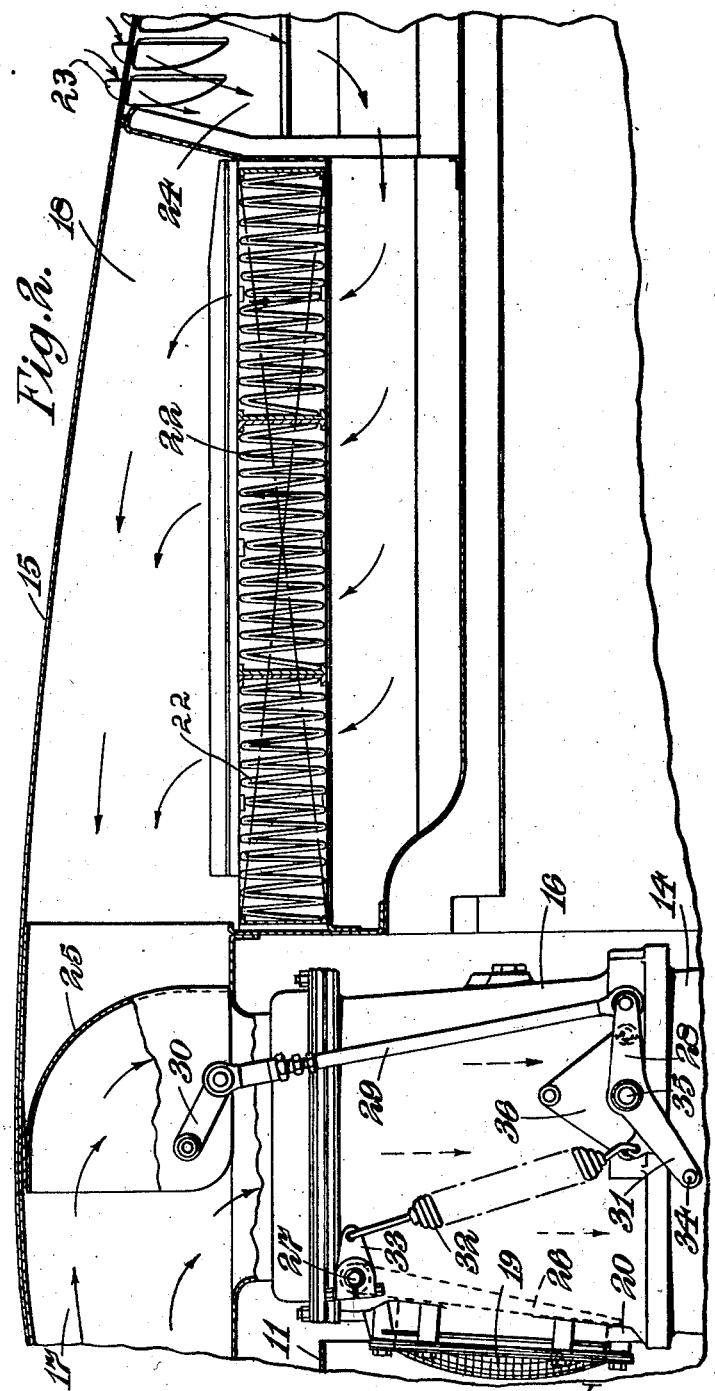

2,396,317

UNITED STATES PATENT OFFICE 2,396,317

AIR INTAKE FOR INTERNAL-COMBUSTION ENGINES

James Cutts, Bristol, England, assignor to The Bristol Aeroplane Company Limited, Bristol, England, a British company Application October 30, 1944, Serial No. 561,088
In Great Britain March 25, 1943

10 Claims. (Cl. 123—122)

This invention concerns air-intakes for internal-combustion engines of the kind which provide a plurality of combustion air supplies for the engine, to suit different operating conditions thereof.

It is an object of the present invention to provide an improved air-intake of the kind referred to, and control means therefor.

According to the present invention the air-intake for an internal-combustion engine comprises three inlets for combustion air to the engine, one of which supplies heated air, in combination with control means for adjusting a valve to selectively permit either of the other two air supplies to pass to the engine and for simultaneously varying the freedom with which a valve controlling the admission of the heated air to the engine is capable of being opened.

According to another feature of the invention said control means comprises a pair of valves one of which selectively permits the admission to the engine of either of two supplies of air and the other of which controls the admission of heated air to the engine, said heated-air valve being capable of opening automatically to admit hot air to the engine when said selector valve is set in one position to select one of the other two supplies of air and being incapable of automatic opening when said selector valve is set in its other position to select the other of said two supplies of air.

In a preferred form the invention comprises the combination with a selector-valve movable to either of two positions by a manual control, of a spring-control tending to maintain said heated-air valve in its closed position, and means whereby the loading of said spring is varied by said manual control.

According to yet another feature of this invention there may also be provided in combination with the heated-air valve, manually operable means capable of overriding its spring-control in one setting of the selector-valve, but incapable of overriding it in the other setting of the selector-valve.

An air-intake in accordance with the present invention is particularly suitable for use in conjunction with an internal-combustion engine for aircraft in which case there is provided a cold-air supply, a filtered-air supply, and said heated-air supply. The provision of these three supplies enables the aircraft to be used under a wide variety of conditions.

A specific embodiment of the present invention will now be described by way of example with reference to the accompanying drawings of which:

Figure 1 is a diagrammatic side view of part of a power-plant installation for an aircraft, to which an air-intake in accordance with the present invention has been fitted to supply the combustion air for the internal-combustion engine of said power-plant, Figure 2 is a side view of the air-intake showing its construction in greater detail, and Figure 3 is a similar view of a part of the control mechanism.

Referring to Figure 1, the internal-combustion engine 10 is of the radial-cylinder air-cooled type and is enclosed in a cowl 11, through the mouth 12 of which cooling air enters, such air passing over the engine to cool it, and being expelled at the rear edge 13 of the cowl. The engine 10 is provided with a down-draught carburettor 14 to which the air-intake (generally indicated at 15) is attached.

The air-intake is arranged as described below to be capable of providing for the carburettor 14 a supply of cold unfiltered air drawn from outside the cowl 11, or a supply of heated-air drawn from the air passing inside the cowl, or a supply of filtered air.

The air-intake 15 comprises an air-intake trunk 16 which communicates at its lower end with the carburettor 14 and at its upper end with a casing providing a forwardly-directed cold-air scoop 17 and with a rearwardly-extending filtered-air duct 18. At the upper end of the trunk 16 there is provided a selector-valve 25 which is of curved or visor-like formation, and constitutes a closure for either the scoop 17 or the duct 18 according to the position to which it is adjusted. In the setting shown it opens the cold-air scoop 17 to the trunk 16 and constitutes a curved guide directing air into the trunk; when the valve 25 is turned in an anti-clockwise direction through a right-angle, it shuts off the communication between the inlet 17 and the trunk 16 and opens communication from the duct 18 to the trunk 16.

Towards the rear or right-hand end of the duct 18, there is provided along its lower surface a series of air-filtering elements 22, and the rear end of the casing 15 is provided with inlet louvres 23 admitting external air to a chamber 24 which communicates with the underside of the air-filters so that external air can pass by way of the filters and duct 18 to the trunk 16 and carburetor 14.

The air-intake trunk 16 is situated near the engine so that the cooling air which has swept across the engine and has become heated thereby impinges upon the wall 20 of the trunk 16 and there is provided on this wall a heated-air-intake or collector 19 and this intake is provided with an inwardly-opening flap or shutter 26 (see Figure 2). The control mechanism for selecting the air-supplies to the carburettor is as follows: On the spindle 27 of the flap-valve 26 there is mounted an arm 33 which is connected by a tension spring 32 to the arm 31 of a two-armed lever, the other arm 28 of this lever being connected by a link 29 to an arm 30 on the spindle of the selector-valve 25. The lever 28 is pivotally mounted at 35 on a plate 36 secured to the wall of the air-intake trunk 16, and it is manually controlled through any suitable link connected at 34 to the arm 31. With this arrangement the selector-valve 25, in the position illustrated, opens the cold-air inlet 17 and closes the filtered-air inlet 18, but when the lever 28 is moved to adjust the selector-valve to its alternative setting, by movement in an anticlockwise direction, it applies tension to the spring 32, and this spring is so designed that its loading in the position illustrated is very light, but is increased when the lever 28 is operated, for the purpose hereinafter set forth.

The cold-air-inlet 17 is provided with an ice and snow guard at its mouth to ensure that ice and snow are prevented from forming within the scoop and intake trunk 16, and is such that when ice or snow accumulates upon it the effective inlet area of the scoop is diminished so as to reduce the quantity of air entering it. The scoop 17 and air intake trunk 16 are made of progressively increasing cross-sectional area from the inlet to the carburettor, so that the velocity-head of the air entering the scoop 17 is partially converted to a pressure-head, thereby establishing an air-pressure inside the air-intake trunk 16.

The operation of the control mechanism will now be described.

When the manual control is set to select the cold-air supply, the levers 28, 29 and 30 set the selector-valve or visor 25 in the position illustrated so that it permits the passage of air to the trunk 16 from the scoop 17 and prevents the passage of air from the duct 18 to the trunk. The position of arm 31 under these conditions is then such that spring 32 is only lightly loaded, sufficient to maintain the shutter 26 pressed lightly against the wall 20 in its closed position behind the hot-air-intake or collector 19. The pressure-head normally prevailing within the air-trunk 16 is sufficient to ensure that the flap-shutter 26 will not open to admit heated air to the trunk 16. However, in the event that the ice and snow guard becomes obstructed, the pressure-head within the air-trunk 16 diminishes. This fall in pressure is sufficient to ensure that the flap-shutter 26 will open and permit hot air to enter the carburettor.

When the control is adjusted to admit filtered air to the carburettor, in the manner above described, the selector-valve 25 is moved to its alternative position, and in so doing the movement of the lever 31 applies tension to the spring 32 so that additional pressure is applied through the arm 27 to the flap-shutter 26 holding it in its closed position behind the hot-air-intake 19, and in these conditions the shutter is not capable of being opened automatically by the suction or low pressure existing in the air-intake trunk 16. The reason for this is that the filters 22 are provided to give a filtered-air supply to the engine when it is operating in conditions in which dust or other solid matter is in suspension in the air, and since the air for cooling the engine is not filtered, it is undesirable that any such air when heated should be admitted to the carburettor. In these conditions, the flap-shutter 26 is firmly held closing the heated-air-intake, but on the other hand when the engine is operating under conditions in which ice or snow are present, it is desirable that heated air should be admitted and, as explained above, when the supply of cold air through the scoop 17 is retarded, the flap-shutter opens automatically.

In certain circumstances it is found desirable to provide an overriding control so that whilst cold unfiltered air is entering by the scoop 17, the pilot may, at his discretion, open the shutter 26 to admit hot air irrespective of whether ice formation of the inlet scoop has taken place. For this purpose the spindle 27 of the shutter 26 carries an additional arm 37, see Figure 3, which conveniently is situated at the opposite side of the air-intake trunk 16 from the lever 30. This arm 37 is connected to an operating lever 38 by a telescopic link 39 which includes a compression spring 40 permitting lost motion between the parts 38 and 37. The parts are so arranged that anticlockwise movement of the lever 38 about its pivot 41 moves the arm 37 in a direction to open the shutter 26. The stiffness of the spring 40 is such that when the tension spring 32 is lightly loaded, that is to say when the parts are set for the direct admission of cold air, the movement of the lever 38 rocks the arm 37 and opens the shutter or in other words the spring 40 is stronger than the spring 32 when the latter is not tensioned. Whenever the spring 32 is put under tension by movement of the lever 28 to admit filtered air, the additional loading tending to hold the shutter 26 in its closed position is greater than can be exerted through the spring 40 of the telescopic arm so that any operation of the lever 38 merely compresses the spring 40 and is inoperative on the shutter 26. Furthermore, it will be appreciated that the overriding control through the telescopic link 39 does not interfere with the automatic opening and closing of the shutter which occurs with variations of pressure in the air-intake duct in the manner above described.

I claim:

1. An air-intake for an internal-combustion engine comprising three inlets for combustion air to the engine, one of which supplies heated air, in combination with control means for adjusting a valve to selectively permit either of the other two air supplies to pass to the engine and for simultaneously varying the freedom with which a valve controlling the admission of the heated air to the engine is capable of being opened.

2. An air-intake as claimed in claim 1, wherein said control means comprises a pair of valves one of which selectively permits the admission to the engine of either of two supplies of air and the other of which controls the admission of heated air to the engine, said heated-air valve being capable of opening automatically to admit hot air to the engine when said selector valve is set in one position to select one of the other two supplies of air and being incapable of automatic opening when said selector valve is set in its other position to select the other of said two supplies of air.

3. In an air-intake as claimed in claim 1, the combination with a selector-valve movable to either of two positions by a manual control, of a spring-control tending to maintain said heated-air valve in its closed position, and means whereby the loading of said spring is varied by said manual control.

4. An air intake as claimed in claim 1, wherein said control comprises a valve which is selectively movable to either of two positions at each of which an air supply is admitted to the engine, a manual control for varying the position of said selector valve, a heated-air valve, a spring control tending to maintain said valve in its closed position and means whereby the loading of said spring control is varied by said manual control whereby the heated-air valve is permitted to open automatically to admit hot air to the engine when said selector valve is set in one position and is prevented from automatically opening when said selector valve is set in its other position.

5. An air intake as claimed in claim 1, wherein said control comprises a valve which is selectively movable to either of two positions at each of which an air supply is admitted to the engine, a manual control for varying the position of said selector valve, a heated-air valve, a spring control tending to maintain said valve in its closed position, means whereby the loading of said spring control is varied by said manual control whereby the heated-air valve is permitted to open automatically to admit hot air to the engine when said selector valve is set in one position and is prevented from automatically opening when said selector valve is set in its other position and manually operable means capable of overriding said spring control in one setting of the selector valve but incapable of over-riding it in the other setting of the selector valve.

6. In combination, in the air intake system of an internal combustion engine, a duct, a trunk connected with the duct and leading to the engine, a valve disposed within the duct at the junction of the latter and the trunk of said valve being selectively movable to either of two positions to permit either one of two supplies of air which flow in opposite directions along the duct to pass to the trunk, a manual control for varying the position of said selector valve, a heated-air valve, a spring control tending to maintain said valve in its closed position and means whereby the loading of said spring control is varied by said manual control whereby the heated-air valve is permitted to open automatically to admit hot air to the engine when said selector valve is set in one position and is prevented from automatically opening when said selector valve is set in its other position.

7. In combination, in the air intake system of an internal combustion engine, a duct, a trunk connected with the duct and leading to the engine, a pivotally mounted visor of curved outline disposed within the duct at the junction of the latter and the trunk of said visor being selectively movable to either of two positions smoothly to direct either one of two supplies of air which flow in opposite directions along the duct into the trunk, a manual control for varying the position of said selector valve, a heated-air valve, a spring control tending to maintain said valve in its closed position and means whereby the loading of said spring control is varied by said manual control whereby the heated-air valve is permitted to open automatically to admit hot air to the engine when said selector valve is set in one position and is prevented from automatically opening when said selector valve is set in its other position.

8. In combination, in the air intake system of an internal combustion engine, a duct, a trunk connected with the duct and leading to the engine, a valve disposed within the duct at the junction of the latter and the trunk of said valve being selectively movable to either of two positions to permit either one of two supplies of air which flow in opposite directions along the duct to pass to the trunk, a manual control for varying the position of said selector valve, a heated-air valve constituted by a shutter which is movable within said trunk so as to swing freely therein towards and away from an opening in the wall of said trunk through which heated air is capable of passing to the engine, a spring control tending to maintain said valve in its closed position and means whereby the loading of said spring control is varied by said manual control whereby the heated-air valve is permitted to open automatically to admit hot air to the engine when said selector valve is set in one position and is prevented from automatically opening when said selector valve is set in its other position.

9. In combination, in an air intake of an internal combustion engine, a duct conveying two air supplies in opposite directions therealong, a trunk connected with the duct and leading to the engine that portion of the duct carrying one such air supply and the trunk into which it leads being of varying cross-sectional area so that the velocity of the air entering said portion of the duct is converted into pressure-head, a valve disposed within the duct at the junction of the latter and the trunk of said valve being selectively movable to either of two positions to permit either one of said two supplies to pass from the duct to the trunk, a manual control for varying the position of said selector valve, a heated-air valve constituted by a shutter which is movable within said trunk so as freely to swing therein and which is opened and closed by variations in the pressure head to regulate the admission of heated air to the engine, a spring control tending to maintain said valve in its closed position and means whereby the loading of said spring control is varied by said manual control whereby the heated-air valve is permitted to open automatically to admit hot air to the engine when said selector valve is set in one position and is prevented from automatically opening when said selector valve is set in its other position.

10. An air intake of an internal combustion engine as claimed in claim 9 in which the portion of said duct which is of varying cross-sectional area is adapted to convey air from outside the engine to said trunk and the other portion of said duct is adapted to convey air from outside the engine through a filter medium and thence to said trunk.

JAMES CUTTS.